United States Patent
Sereni

(10) Patent No.: US 6,347,517 B1
(45) Date of Patent: Feb. 19, 2002

(54) HYDRAULIC CIRCUIT WITH A SELF-CALIBRATING DEVICE FOR AGRICULTURAL OR EARTHMOVING MACHINERY

(75) Inventor: Eugenio Sereni, Albareto (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/439,262

(22) Filed: Nov. 12, 1999

(30) Foreign Application Priority Data

Nov. 18, 1998 (IT) .......................... BO98A0642

(51) Int. Cl.⁷ .......................... F16D 31/02; F15B 13/044
(52) U.S. Cl. .......................... 60/459; 91/459
(58) Field of Search .............. 91/459; 60/445, 60/452; 251/129.15; 73/1.25, 1.26

(56) References Cited

U.S. PATENT DOCUMENTS 4,856,278 A * 8/1989 Wildmann et al. ........ 60/452 X
5,762,475 A * 6/1998 Maddock et al. ......... 60/431 X
5,784,945 A * 7/1998 Krone et al. ............. 91/459 X
5,844,390 A * 12/1998 Cameron ................. 60/327 X

* cited by examiner

Primary Examiner—John E. Ryznic
(74) Attorney, Agent, or Firm—Larry W. Miller; John William Stader

(57) ABSTRACT

A hydraulic circuit with one or more electrically operated hydraulic distributors is provided for an agricultural or earthmoving machine. A pump unit supplies pressurized fluid to the hydraulic distributors which, in turn, supply the pressurized fluid, on command, to the hydraulic power take-offs of the hydraulic circuit. An electronic central control unit controls the electrically operated valves of the hydraulic distributors to regulate supply of the pressurized fluid to the hydraulic power take-offs. The hydraulic circuit also includes a self-calibrating device for determining, on command, the position, in a reference plane, of the response curves of individual electrically operated valves, so that the pressurized fluid supply set by the driver of the vehicle for any one hydraulic power take-off always corresponds exactly with the amount actually supplied by the take-off.

8 Claims, 3 Drawing Sheets

HYDRAULIC CIRCUIT WITH A SELF-CALIBRATING DEVICE FOR AGRICULTURAL OR EARTHMOVING MACHINERY

BACKGROUND OF THE INVENTION

The present invention relates to a hydraulic circuit with a self-calibrating device for agricultural or earthmoving machinery.

As well known in the art, both agricultural and earthmoving machines comprise a hydraulic circuit for powering various vehicle-mounted devices, such as the steering assembly, differential, power transmission, shovel lifting and lowering assembly (if any), etc. The hydraulic circuit normally also comprises one or more hydraulic power take-off devices for temporarily connecting off-vehicle devices or implements having hydraulic motors and/or actuators to be driven by the hydraulic circuit of the vehicle.

The hydraulic circuit currently comprises one or more electrically controlled hydraulic distributors which are supplied with a high-pressure fluid and, on command, distribute the fluid to the hydraulic power take-off devices. The circuit further comprises a variable-delivery pump for supplying the high-pressure fluid to the hydraulic distributors, and an electronic central control unit is operable to control the hydraulic distributors in order to regulate the flow of high-pressure fluid from the individual hydraulic power take-off devices.

A major drawback of the above type of hydraulic circuit is the relatively high-cost maintenance involved.

That is to say, each hydraulic distributor comprises one or more electrically operated valves for regulating flow to the hydraulic power take-off devices connected to the distributor. In view of the delicate task performed by the valves, the electronic central control unit is calibrated for each hydraulic device at the vehicle assembly stage to ensure that the high-pressure fluid supply set by the driver of the vehicle for whatever hydraulic power take-off device corresponds exactly with the high-pressure fluid actually supplied by said hydraulic power take-off device.

Problems arise, however, when the electrically operated valves of the hydraulic distributor break down and need replacement. In this case, as opposed to simply replacing the valves, the entire hydraulic distributor must be replaced, and the electronic central control unit controlling the distributors must be re-calibrated. Moreover, calibrating the electronic central control unit is a highly skilled job which can only be carried out at the factory or specially equipped service centers, with obvious consequences in terms of cost.

SUMMARY OF THE INVENTION

It is therefore an object of the present invention to provide a hydraulic circuit for agricultural or earthmoving machinery, designed to eliminate the aforementioned drawbacks.

It is a feature of this invention to provide a hydraulic circuit for agricultural or earthmoving machinery in which at least one electrically controlled hydraulic distributor is supplied with a high-pressure fluid and, on command, distributes the high-pressure fluid to at least one hydraulic power take-off. The hydraulic circuit also includes a pump unit for supplying the high-pressure fluid to said hydraulic distributor and a control unit for controlling said electrically controlled hydraulic distributor to regulate the flow of high-pressure fluid through the hydraulic power take-off.

It is another feature of this invention that the hydraulic distributor has at least one electrically operated valve for regulating the passage of the high-pressure fluid to the hydraulic power take-off. The hydraulic circuit includes a self-calibrating mechanism for determining the response curve of the electrically operated valve, and for calibrating the control unit on the basis of the response curve.

It is a further object of this invention to provide a method of calibrating a hydraulic circuit for agricultural or earthmoving machinery.

It is still another feature of the invention that the method includes the steps of:

supplying a gradually increasing current to a single electrically operated valve of an electrically controlled hydraulic distributor of said hydraulic circuit, any eventually other electrically operated valves being left de-energized;

determining the electric current value at which the electrically operated valve begins to open; and determining, on the basis of the electric current value, the position, in a reference plane, of the response curve associated with the electrically operated valve.

These and other objects, features and advantages are accomplished according to the instant invention in which an agricultural or earthmoving machine includes a hydraulic circuit for one or more electrically operated hydraulic distributors. A pump unit supplys a pressurized fluid to the hydraulic distributors which, in turn, supply the pressurized fluid, on command, to the hydraulic power take-offs of the hydraulic circuit. An electronic central control unit controls the electrically operated valves of the hydraulic distributors to regulate supply of the pressurized fluid to the hydraulic power take-offs. The hydraulic circuit also includes a self-calibrating device for determining, on command, the position, in a reference plane, of the response curves of individual electrically operated valves, so that the pressurized fluid supply set by the driver of the vehicle for any one hydraulic power take-off always corresponds exactly with the amount actually supplied by the take-off.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
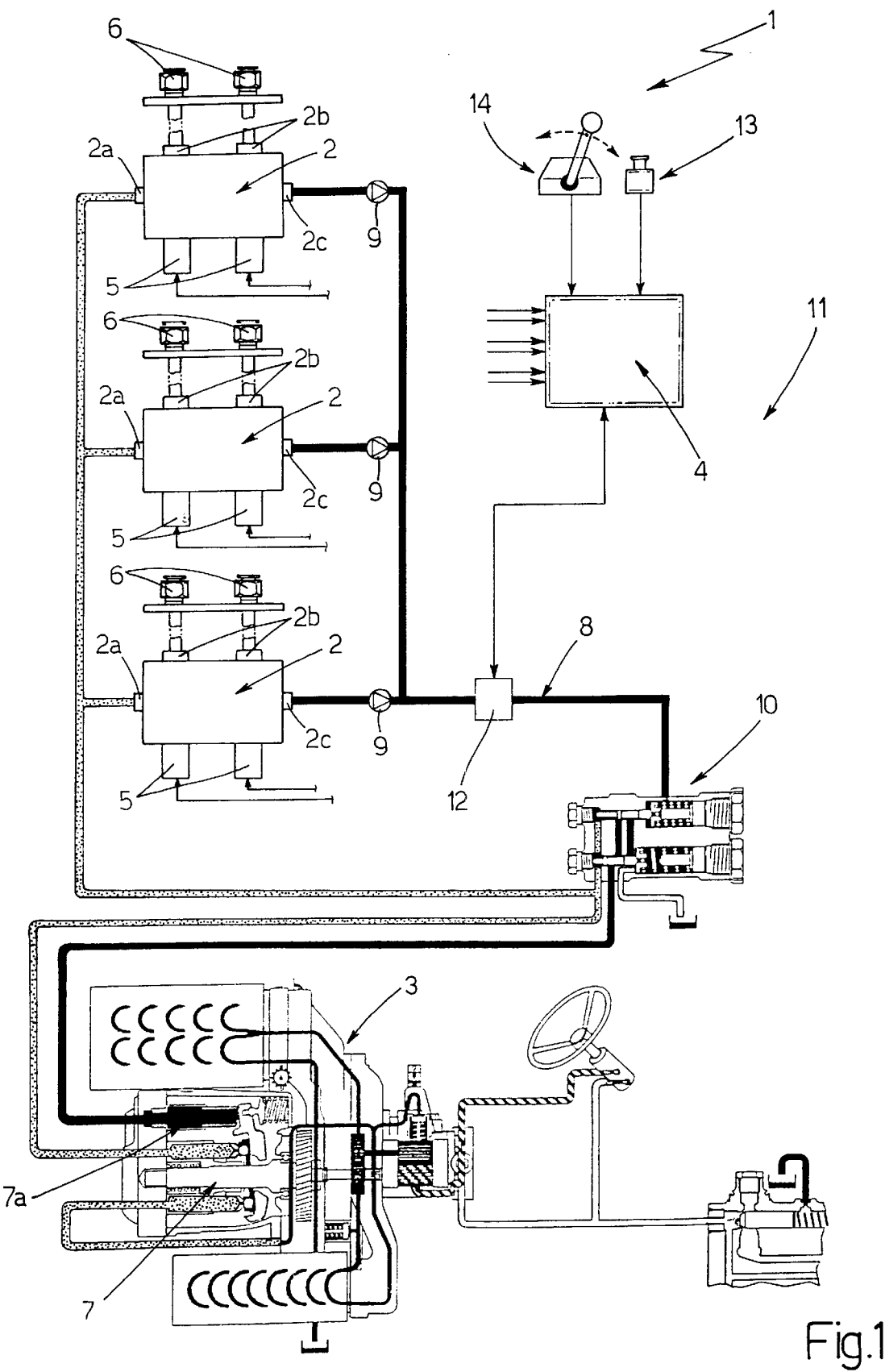
FIG. 1 schematically shows a hydraulic circuit with a self-calibrating device for agricultural or earthmoving machinery, in accordance with the teachings of the present invention.

Number 1 in FIG. 1 indicates as a whole a hydraulic circuit for agricultural or earthmoving machinery, for powering various on-vehicle devices (e.g. the steering assembly, the differential, the power transmission, etc.) and any other off-vehicle devices or implements connectable to the vehicle as required.

Hydraulic circuit 1 comprises one or more electrically controlled hydraulic distributors 2, which are supplied with a high-pressure fluid (generally oil) and, on command, distribute the fluid to one or more user devices (not shown). A pump unit 3 is provided for supplying said high-pressure fluid to said hydraulic distributors 2 and an electronic central control unit 4 is operable to control the hydraulic distributors 2 for regulating the supply of the high-pressure fluid to each user device as demanded by the driver of the vehicle.

In the example shown, driver demand is detected by electronic central control unit 4 via one or more known hand levers 14 operated by the driver of the vehicle and preferably, though not necessarily, located on the dashboard of the vehicle.

Each hydraulic distributor 2, of known type, comprises an inlet 2a through which the high-pressure fluid is fed thereto; one or more outlets 2b through which the high-pressure fluid flows out on command; and one or more electrically operated valves 5 for regulating the flow of the high-pressure fluid from inlet 2a to outlets 2b.

Outlets 2b of hydraulic distributors 2 each communicate with a respective hydraulic power take-off 6 of hydraulic circuit 1. The above mentioned user devices, i.e. off-vehicle devices or implements, are connectable to said hydraulic power take-offs 6 to power the hydraulic motors and/or actuators of the devices or implements by means of hydraulic circuit 1.

Electronic central control unit 4 drives electrically operated valves 5 to regulate high-pressure fluid flow to each hydraulic power take-off 6 as demanded by the driver of the vehicle, i.e. on the basis of the position of hand lever(s) 14.

Hydraulic distributor 2 further comprises an auxiliary outlet 2c through which high-pressure fluid flows out at a pressure depending on the flow of high-pressure fluid to outlets 2b of the distributor.

With reference to FIG. 1, pump unit 3 is of a conventional type, and comprises a variable-delivery pump 7, the displacement of which is regulated by a hydraulic actuator 7a controlled by the high-pressure fluid from auxiliary outlets 2c of hydraulic distributors 2.

Auxiliary outlets 2c in fact are connected to hydraulic actuator 7a of pump 7 by a feedback or so-called load-sensing conduit 8. In the example shown, feedback conduit 8 of hydraulic circuit 1 comprises a number of non-return valves 9 located along the branches extending from feedback conduit 8 to respective auxiliary outlets 2c. The conduit 8 further comprises a regulating or so-called load-sensing valve 10 for supplying the hydraulic actuator of pump 7 with a quantity of high-pressure fluid depending on the amount of fluid delivered by pump 7 and on the amount of fluid delivered from auxiliary outlets 2c. Regulating valve 10 is located along the main portion of feedback conduit 8, immediately upstream of the hydraulic actuator of pump 7, and is defined by a conventional flow compensating valve and a conventional pressure compensating valve connected to each other in a cascade-like manner.

In accordance with the present invention, hydraulic circuit 1 further comprises a self-calibrating device 11 for determining the response curve Q(I) of each electrically operated valve 5, and for calibrating electronic central control unit 4 so that the fluid supply set by the driver of the vehicle for whichever of the hydraulic power take-offs 6 always exactly corresponds with the high-pressure fluid actually supplied by the actuated hydraulic power take-off 6.

Figure 2:
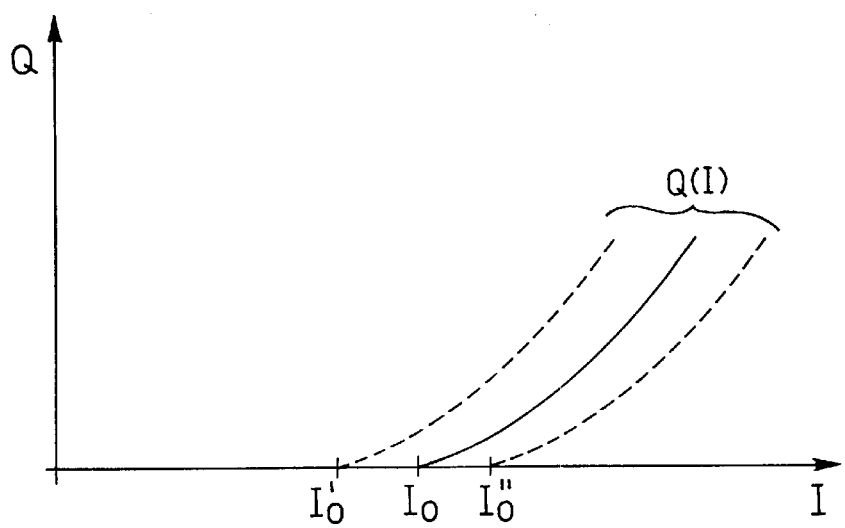
FIG. 2 shows a number of response curves of a component of the hydraulic circuit of FIG. 1.

With reference to FIG. 2, as is known, electrically operated valves 5 of hydraulic distributors 2 all have a substantially similar flow-current response curve Q(I). However, due to manufacturing tolerances, the position of the response curve in the reference plane varies from one valve to another. In the example shown, the variation is caused by different values of current $I_o$ at which valve 5 begins to open, i.e. at which fluid starts flowing through outlet 2b.

Figure 5:
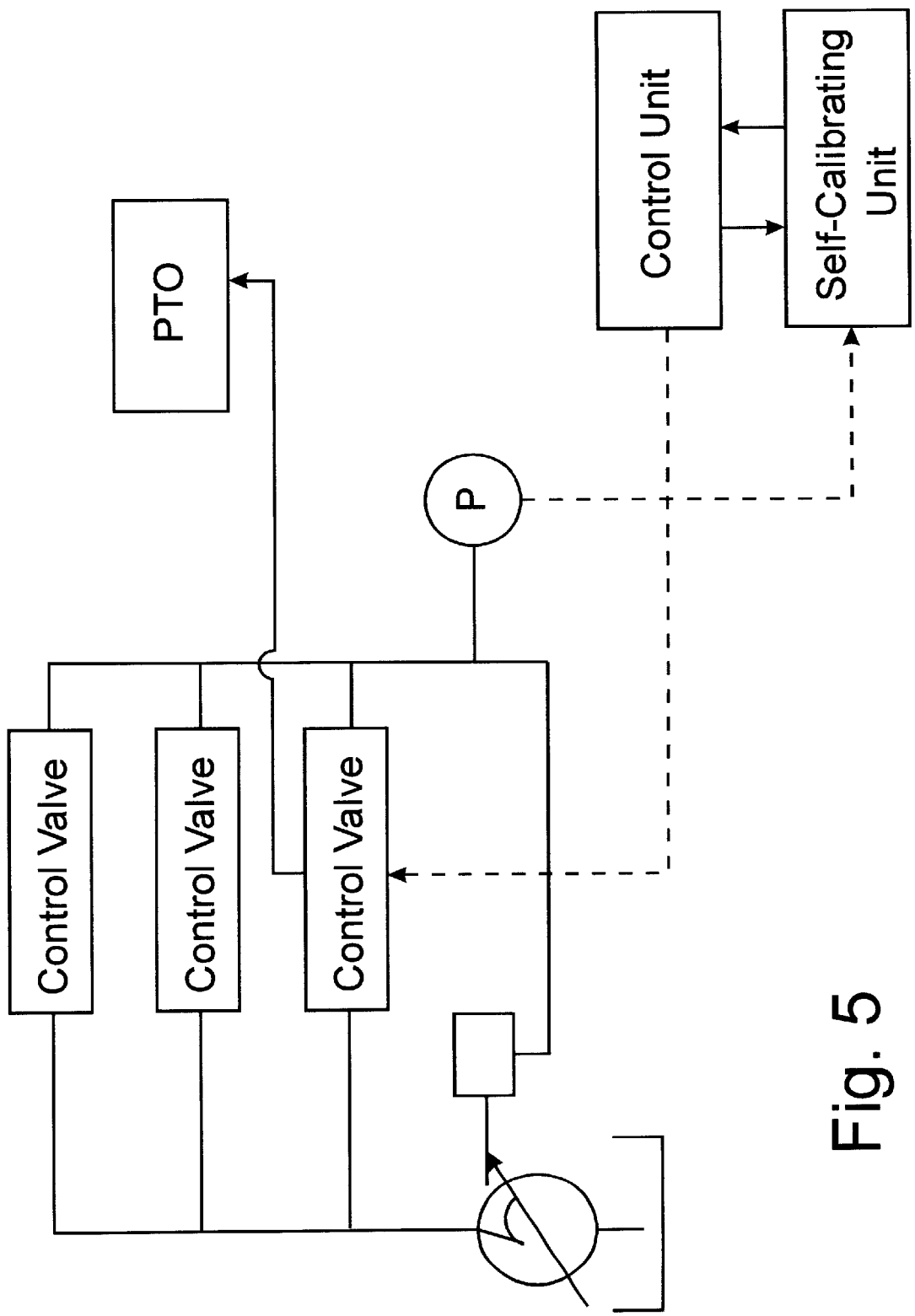
FIG. 5 is a schematic representation of the hydraulic circuit incorporating the principles of the instant invention.

With reference to FIGS. 1 and 5, the self-calibrating device 11 is activated by the driver of the vehicle, e.g. by means of a push-button 13. The device 11 comprises the electronic central control unit 4, or rather a portion of it, and a manostat 12 located along feedback conduit 8, upstream from regulating valve 10. Manostat 12, which may be replaced by a known pressure switch, is connected to electronic central control unit 4, and is operable to monitor, instant by instant, the pressure of the fluid in feedback conduit 8, whereby any variation in pressure is detected.

Operation of hydraulic circuit 1 and associated self-calibrating device 11 will now be described assuming that self-calibrating device 11 has just been activated by the driver of the vehicle by pressing the push-button 13, and that no user devices are connected to the hydraulic power take-offs 6. Under these operating conditions, a minimum quantity of high-pressure fluid is circulated in hydraulic circuit 1 by pump 7 to keep hydraulic circuit 1 full and ready to perform as commanded by the driver.

Figure 3:
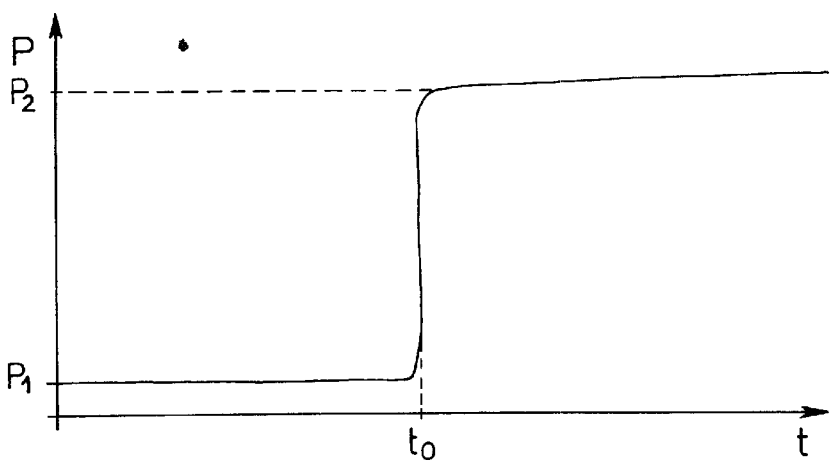
FIGS. 3 and 4 show time graphs of a number of variables of the FIG. 1 hydraulic circuit during operation.
Figure 4:
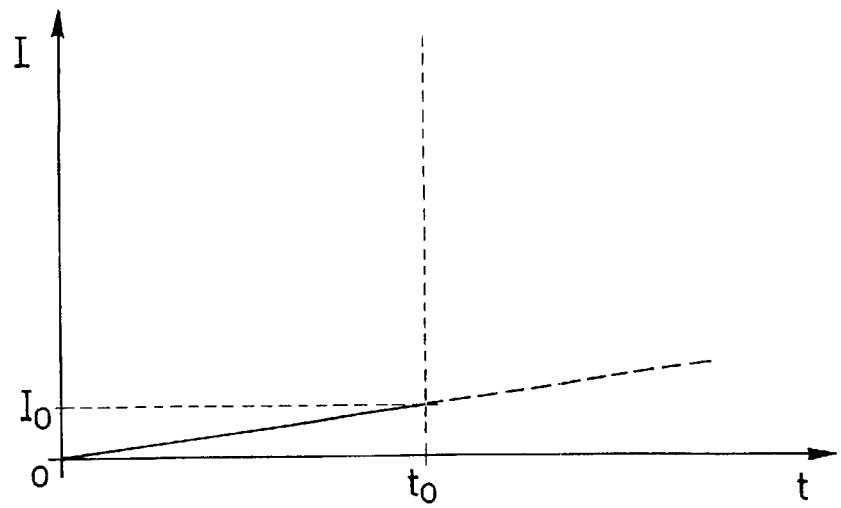

In actual use, with hydraulic power take-offs 6 closed, the electronic central control unit 4 gradually begins to increase from zero the current circulating in one of the electrically operated valves 5, while leaving the other valves de-energized. With reference to FIGS. 3 and 4, as the electric current increases gradually and as long as valve 5 remains closed, manostat 12 detects a pressure of value P1 (normally about 20 bars).

At instant to, the electric current circulating in valve 5 reaches a value $I_o$ sufficient to start opening valve 5, while the pressure of the fluid in feedback conduit 8 switches, with a substantial stepped change, from value P1 to a much higher value P2 (of about 200 bars). The step pattern of the pressure change of the fluid in feedback conduit 8 under the above operating conditions is widely known.

By means of manostat 12, the electronic central control unit 4 thus detects when valve 5 starts opening, internally memorizes current value $I_o$, and immediately determines the position, in the reference plane, of the response curve Q(I) associated with valve 5. If manostat 12 is replaced by a pressure switch, electronic central control unit 4 detects the opening of valve 5 when the switch trips. The pressure switch must of course be set to trip when the pressure exceeds a threshold value between pressure values P1 and P2 (e.g. 120 bars).

Having determined the current value $I_o$ for a first valve 5, the electronic central control unit 4 de-energizes said valve 5 and commences the above calibration procedure for a second one of the valves 5. By determining a new current value $I''_o$ for said second valve 5, the position, in the reference plane, of the response curve Q(I) of said second valve 5, can be determined in a similar manner as with the first valve 5.

By repeating the calibration procedure for all valves 5 of all the hydraulic distributors 2, electronic central control unit 4 determines the position, in the reference plane, of the response curves Q(I) of all the valves 5, and is therefore able to supply each valve 5 with electric current of such a value as to obtain the exact high-pressure fluid flow requested by the driver of the vehicle.

In other words, electronic central control unit 4 is capable of calibrating itself so that the fluid supply demanded by the driver of the vehicle for any one of the hydraulic power take-offs 6 always corresponds exactly with the high-pressure fluid actually supplied to the take-off.

Besides the obvious advantage of eliminating re-calibration of the electronic central control unit 4 in a plant whenever a hydraulic distributor 2 is repaired, self-calibrating device 11 also provides for faster initial calibration of electronic central control unit 4 during manufacture of the vehicle, thus reducing production costs.

Self-calibrating device 11 also has the further advantage of being extremely cheap manostat 12 is a low-cost component, while the alterations to electronic central control unit 4 are marginal and in essence are restricted to software modifications, and therefore are of negligible cost.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A hydraulic circuit for agricultural or earthmoving machinery, comprising:

a variable displacement pump for supplying the high-pressure fluid to said hydraulic distributor;

at least one electrically controlled hydraulic distributor which is supplied with a high-pressure fluid and, on command, distributes said high-pressure fluid to at least one hydraulic power take-off, said hydraulic distributor regulating the delivery of said variable displacement pump by means of a fluid flow returned to said variable displacement pump through a feedback conduit;

a control unit for controlling said electrically controlled hydraulic distributor to regulate the flow of high-pressure fluid through said hydraulic power take-off, said hydraulic distributor having at least one electrically operated valve for regulating the passage of the high-pressure fluid to said hydraulic power take-off; and a self-calibrating means for determining a response curve of said at least one electrically operated valve, and for calibrating said control unit on the basis of said response curve said self-calibrating means including detecting means for detecting variations in the pressure of the fluid in said feedback conduit.

2. The hydraulic circuit of claim 1, wherein said detecting means for detecting variations in the pressure of the fluid in said feedback conduit includes a manostat located along said feedback conduit.

3. The hydraulic circuit of claim 1, wherein said detecting means for detecting variations in the pressure of the fluid in said feedback conduit includes a pressure switch located along said feedback conduit.

4. The hydraulic circuit of claim 1, wherein said self-calibrating means comprises an electronic central control unit connected to said detecting means, said electronic central control unit being operable, in succession, to supply the electrically operated valve of the hydraulic distributor with a gradually increasing current, and to determine, in co-operation with said detecting means, the electric current value at which the electrically operated valve begins opening, the electronic central control unit also determining, on the basis of said electric current value, the position, in a reference plane, of the response curve associated with said electrically operated valve.

5. The hydraulic circuit of claim 4 wherein said control unit comprises the electronic central control unit of said self-calibrating means.

6. The hydraulic circuit of claim 5 wherein the operation of said self-calibrating means is initiated by the driver of the vehicle.

7. A method of calibrating a hydraulic circuit for agricultural or earthmoving machinery comprising the steps of:

supplying a gradually increasing current to a single electrically operated valve of an electrically controlled hydraulic distributor of said hydraulic circuit, any eventually other electrically operated valves being left de-energized;

determining the electric current value at which said electrically operated valve begins to open by detecting a substantial stepped change in the pressure of a fluid in a feedback conduit of said hydraulic circuit; and determining, on the basis of said electric current value, the position, in a reference plane, of a response curve associated with said electrically operated valve.

8. The method of claim 7, wherein said step of supplying a gradually increasing current to one electrically operated valve of the hydraulic distributor is performed with the hydraulic power take-offs of the hydraulic circuit closed.

* * * * *